United States Patent

Nogiwa et al.

Patent Number: 6,122,087
Date of Patent: Sep. 19, 2000

[54] OPTICAL-FREQUENCY-STABILIZED LIGHT SOURCE

[75] Inventors: Seiji Nogiwa; Tatsuhiko Takatsu; Naoto Sato; Kazuo Aida; Hiroji Masuda, all of Tokyo, Japan

[73] Assignees: Ando Electric Co., Ltd.; Nippon Telegraph and Telephone Corporation, both of Tokyo, Japan

[21] Appl. No.: 09/027,027

[22] Filed: Feb. 20, 1998

[30] Foreign Application Priority Data

Feb. 24, 1997 [JP] Japan .................................. 9-039525

[51] Int. Cl.[7] .................................................. H04B 10/04
[52] U.S. Cl. .............................. 359/187; 359/110; 372/32
[58] Field of Search .................................. 359/187, 124, 359/110, 115; 372/29, 32

[56] References Cited

U.S. PATENT DOCUMENTS

| | | | |
|---|---|---|---|
| 5,510,922 | 4/1996 | Naito | 359/124 |
| 5,861,975 | 1/1999 | Sakuyama et al. | 359/187 |
| 5,943,152 | 8/1999 | Mizrahi et al. | 359/187 |

FOREIGN PATENT DOCUMENTS 2567776  9/1993  Japan .

OTHER PUBLICATIONS

S. Nogiwa et al., "Development of Lightwave Frequency Synthesizer Using a Time Shared Lightwave Reference Frequency" in *Proceedings of the 1996 Communication Society Conference of IEICE*, Sep. 18–21, 1996, Communications Society, The Inst. of Electronics, Information & Communication Engineers B–1067, p. 552.

*Primary Examiner*—Kinfe-Michael Negash
*Attorney, Agent, or Firm*—Fish & Richardson P.C.

[57] ABSTRACT

The purpose of the invention is to offer an optical-frequency-stabilized light source with high accuracy and stability of the optical frequency. An optical splitter 8 splits output light from a local light source 7 into two beams. An optical detector 2 detects beat signals formed by the superimposition of the optical frequency difference between the local light source 7 and the output light, and a rectifier 3 rectifies the beat signal. A time measuring circuit 4 measures the time at which the beat signal was obtained. A frequency measuring circuit 5 measures the beat frequency. A CPU 6 outputs the deviation between the output light from the local light source 7 and the target optical frequency. A Fabry-Perot etalon transmission detection circuit 11 outputs an electrical signal corresponding to the optical frequency of the output light from an optical splitter 9. A control circuit 12 controls the optical frequency of the local light source 7 such that the electrical signal always matches the electrical signal corresponding to the target optical frequency. A Fabry-Perot etalon control circuit 10 corrects the relationship between the output electrical signal and the optical frequency of the light input to the Fabry-Perot etalon transmission detection circuit 11.

10 Claims, 8 Drawing Sheets

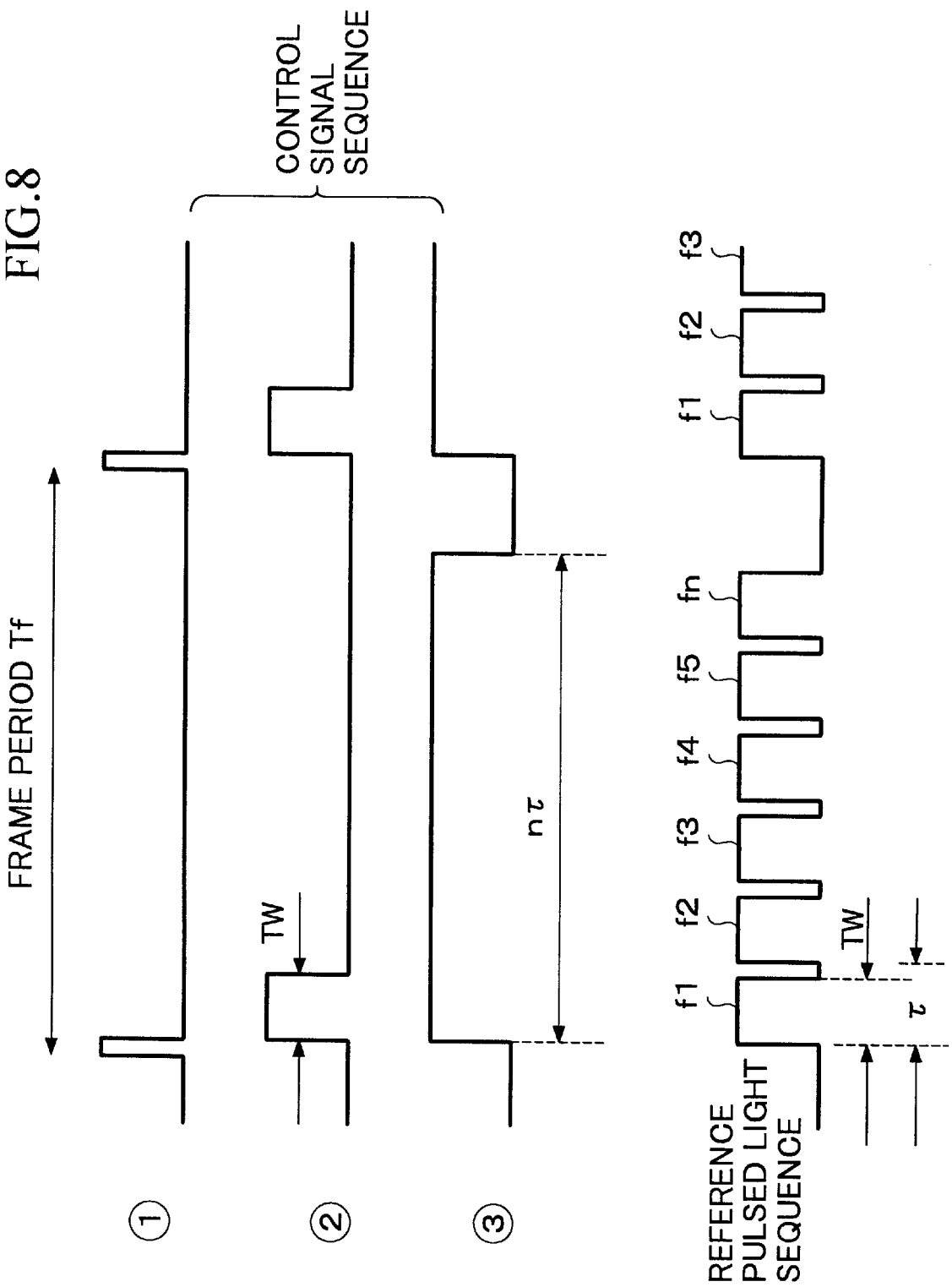

OPTICAL-FREQUENCY-STABILIZED LIGHT SOURCE

BACKGROUND OF THE INVENTION

1. Field of the Invention

The present invention relates to optical-frequency-stabilized light sources with high accuracy and stability of the optical frequency, used for the reference optical frequencies of optical-frequency-multiplexed transmission systems, local light sources for transmitters or receivers, and light sources for high-resolution frequency analysis.

The present application is based on Patent Application No. Hei 9-39525 filed in Japan, the content of which is incorporated herein by reference.

2. Conventional Art

In the present specification, pulsed light having an optical frequency which changes by a standard frequency interval each standard period of time shall be referred to as "reference pulsed light", and a pulsed sequence of the reference pulsed light shall be referred to as a "reference pulsed light sequence".

Japanese Patent Application No. Hei 4-32274 (Japanese Patent No. 2567776) describes an optical-frequency-stabilized light source which receives an optical signal in which such a reference pulsed light sequence is repeated at a predetermined period, capable of generating a continuous beam of an arbitrary optical frequency based on the optical signal, wherein the accuracy and stability of the optical frequency can be controlled to 10 MHz or less.

FIG. 7 is a block diagram showing an example of the structure of such a conventional optical-frequency-stabilized light source, and FIG. 8 is a time chart showing an example of the timing of various control signals in this optical-frequency-stabilized light source. In FIG. 8, signals (1)–(3) correspond to parts (1)–(3) in FIG. 7.

The optical-frequency-stabilized light source 700 shown in FIG. 7 stabilizes the optical frequency by using the output beam from the reference frequency generating device 500 shown in the same drawing.

In FIG. 7, the reference frequency generating device 500 comprises a pulsed light source 600 composed of a single-wavelength light source 16 capable of generating light of optical frequency $f$ and an optical switch 17, and an optical loop circuit connecting an 10 optical multiplexer 18, an optical switch 19, an optical delay line 20, a wavelength-converting element 21, an optical amplifier 22 and an optical splitter 23.

The pulsed light source 600 introduces pulsed light having a pulse width of $T_w$ and a period of $Tf$ into the optical loop circuit via the optical multiplexer 18. This pulsed light circulates through the optical loop, as a result of which the above-described reference pulsed light sequence is output from the optical splitter 23. At this time, the optical switch 19 is opened before introducing the next pulsed light into the optical loop, so as to reset the pulsed light which is circulating. Then, the next pulsed light is introduced into the optical loop. As a result, a reference pulsed light sequence is repeatedly output at a predetermined period.

Additionally, the optical-frequency-stabilizing light source 700 comprises an optical multiplexer 1, an optical detector 2, a rectifier 3, a time measuring circuit 4, a frequency measuring circuit 5, a CPU 706, a local light source 707 and an optical splitter 8.

At the optical multiplexer 1, the reference pulsed light output from the reference frequency generating device 500 is combined with a portion of the output beam of the local light source 707 split by the optical splitter 8. The optical detector 2 detects pulsed beat signals between the reference pulsed light and the local light. The time measuring circuit 4 synchronizes with the standard period of the reference pulsed light sequence and measures the time of detection of the beat signals. Furthermore, the frequency measuring circuit 5 measures the frequency of the beat signal. At this time, the optical frequency of the local light source 707 can be calculated from the set of measured data (time, frequency). By feeding back these calculated values to the local light source 707 via the CPU 706, it is possible to output CW light of an arbitrary optical frequency.

When using an optical-frequency-stabilized light source as described above as an optical frequency standard device or a light source for high-density wavelength-multiplexed communications, the stability and accuracy of the optical frequency should preferably be high. In conventional optical-frequency-stabilized light sources, when the reference pulsed light to the optical-frequency-stabilized light source is cut off due to a fault or the like on the transmission line to the reference frequency generating device or the optical-frequency-stabilized light source, it becomes impossible to control the frequency of the optical-frequency-stabilized light source, thereby degrading the stability and accuracy of the optical frequency.

Additionally, since the beat signal frequency measuring time is short in conventional optical-frequency-stabilized light sources, there is a large dispersion in the detected frequencies. This can result in divergence of control if direct feedback is applied to the local light source, thus worsening the degree of stability of the optical frequency. For this reason, the dispersion must be controlled by averaging after detecting the frequency of the beat signal 10–100 times, thus prolonging the processing time.

Furthermore, since the frame of the reference pulsed light is long, a considerable period of time elapses from the time at which the frequency of the beat signal is detected until the time at which control is fed back to the local light source, thus degrading the short-term stability.

SUMMARY OF THE INVENTION

The present invention has been achieved in view of the above-described considerations, and has the object of offering an optical-frequency-stabilized light source wherein the optical frequency of the output beam is highly accurate and stable.

The present invention is an optical-frequency-stabilized light source comprising a local light source for generating light of an arbitrary optical frequency; optical splitting means for splitting output light from said local light source into two parts; optical multiplexing means for combining one of the outputs of said optical splitting means with reference pulsed light which is an optical signal wherein a pulsed light sequence of which the optical frequency changes by a standard frequency interval each standard period of time is repeatedly generated at a predetermined period; optical detecting means for detecting, based on the output light from said optical multiplexing means, a pulsed beat signal which is a superimposition of a difference in frequencies between the optical frequency of the output light from said local light source and the optical frequency of the reference pulsed light; rectifying means for rectifying the beat signal detected by said optical detecting means, and generating a rectangular pulse; time measuring means for measuring the time at which the rectangular pulse from said rectifying means is obtained in synchronization with the repetition period of said reference pulsed light; frequency measuring means for measuring a beat frequency based on said beat signal detected by said optical detecting means; calculation means for calculating the optical frequency of the output light from said local light source based on output signals from said time measuring means and said frequency measuring means, and outputting a control signal corresponding to the deviation from a predetermined target optical frequency; second optical splitting means for splitting the other output of said optical splitting means into two parts and outputting one part from an output terminal; optical frequency discriminating means for outputting, based on the other output of said second optical splitting means, an electrical signal corresponding to the optical frequency thereof; control means for controlling the optical frequency of said local light source such that the output signal from said optical frequency discriminating means is always an electrical signal corresponding to the target optical frequency; and optical frequency discrimination control means for outputting a correction signal to said optical frequency discriminating means for correcting the relationship between the optical frequency of the input light to said optical frequency discriminating means and the electrical signal output by said optical frequency discriminating means, based on a control signal output by said calculation means.

Additionally, the present invention is an optical-frequency-stabilized light source comprising a local light source for generating light of an arbitrary optical frequency; optical splitting means for splitting output light from said local light source into two parts; second optical splitting means for splitting reference pulsed light which is an optical signal wherein a pulsed light sequence of which the optical frequency changes by a standard frequency interval each standard period of time is repeatedly generated at a predetermined period; optical multiplexing means for combining one of the outputs of said optical splitting means with one of the outputs of said second optical splitting means; optical detecting means for detecting, based on the output light from said optical multiplexing means, a pulsed beat signal which is a superimposition of a difference in frequencies between the optical frequency of the output light from said local light source and the optical frequency of the reference pulsed light; frequency measuring means for measuring a beat frequency based on said beat signal detected by said optical detecting means; second optical detecting means for detecting the optical signal of the other output of said second optical splitting means; pulse number measuring means for measuring a pulse number of the output signal from said second optical detecting means; calculation means for calculating the optical frequency of the output light from said local light source based on output signals from said pulse number measuring means and said frequency measuring means, and outputting a control signal corresponding to the deviation from a predetermined target optical frequency; third optical splitting means for splitting the other output of said optical splitting means into two parts and outputting one part from an output terminal; optical frequency discriminating means for outputting, based on the other output of said third optical splitting means, an electrical signal corresponding to the optical frequency thereof; control means for controlling the optical frequency of said local light source such that the output signal from said optical frequency discriminating means is always an electrical signal corresponding to the target optical frequency; and optical frequency discrimination control means for outputting a correction signal to said optical frequency discriminating means for correcting the relationship between the optical frequency of the input light to said optical frequency discriminating means and the electrical signal output by said optical frequency discriminating means, based on a control signal output by said calculation means.

According to the present invention, since the optical frequency of the local light source is stabilized based on the optical frequency vs. transmission characteristics of Fabry-Perot etalons, the control time is shortened and the short-term stability is improved.

Additionally, even when the reference pulsed light is cut off, since the optical frequency is stabilized based on the optical frequency vs. transmission characteristics of the Fabry-Perot etalon, the accuracy and stability of the optical frequency are regulated by the drift in the Fabry-Perot etalon. The accuracy and stability of the optical frequency are improved in comparison to conventional optical-frequency-stabilized light sources because this drift is ten times higher in stability than that of the optical frequency of the local light source alone.

BRIEF DESCRIPTION OF THE DRAWINGS

FIG. 8 is a time chart showing an example of the timing of various control signals in a conventional optical-frequency-stabilized light source.

DESCRIPTION OF PREFERRED EMBODIMENTS

Hereinbelow, embodiments of the present invention shall be explained with reference to the drawings.

A. First Embodiment

Figure 1:
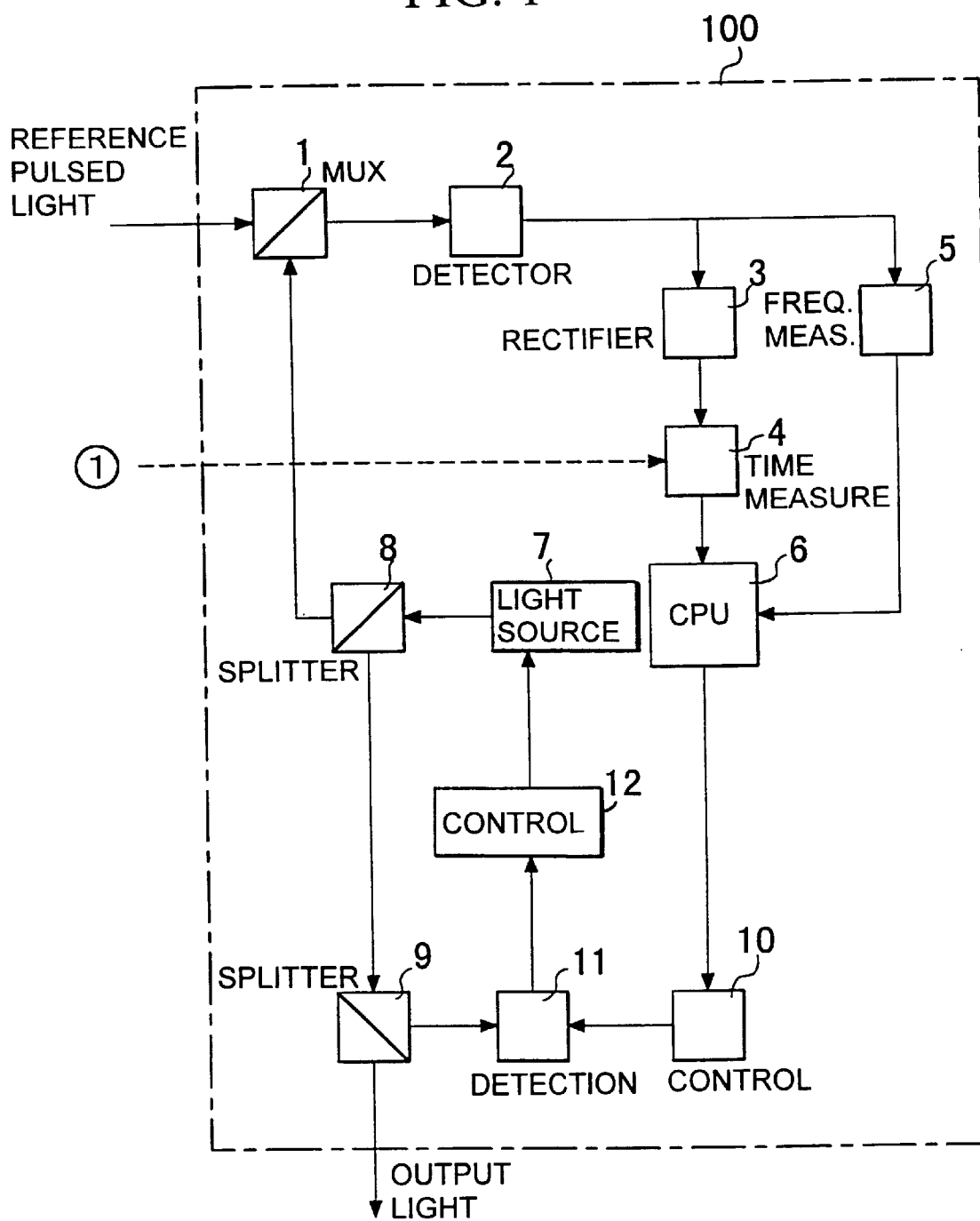
FIG. 1 is a block diagram showing an example of the structure of an optical-frequency-stabilized light source according to a first embodiment of the present invention.
Figure 7:
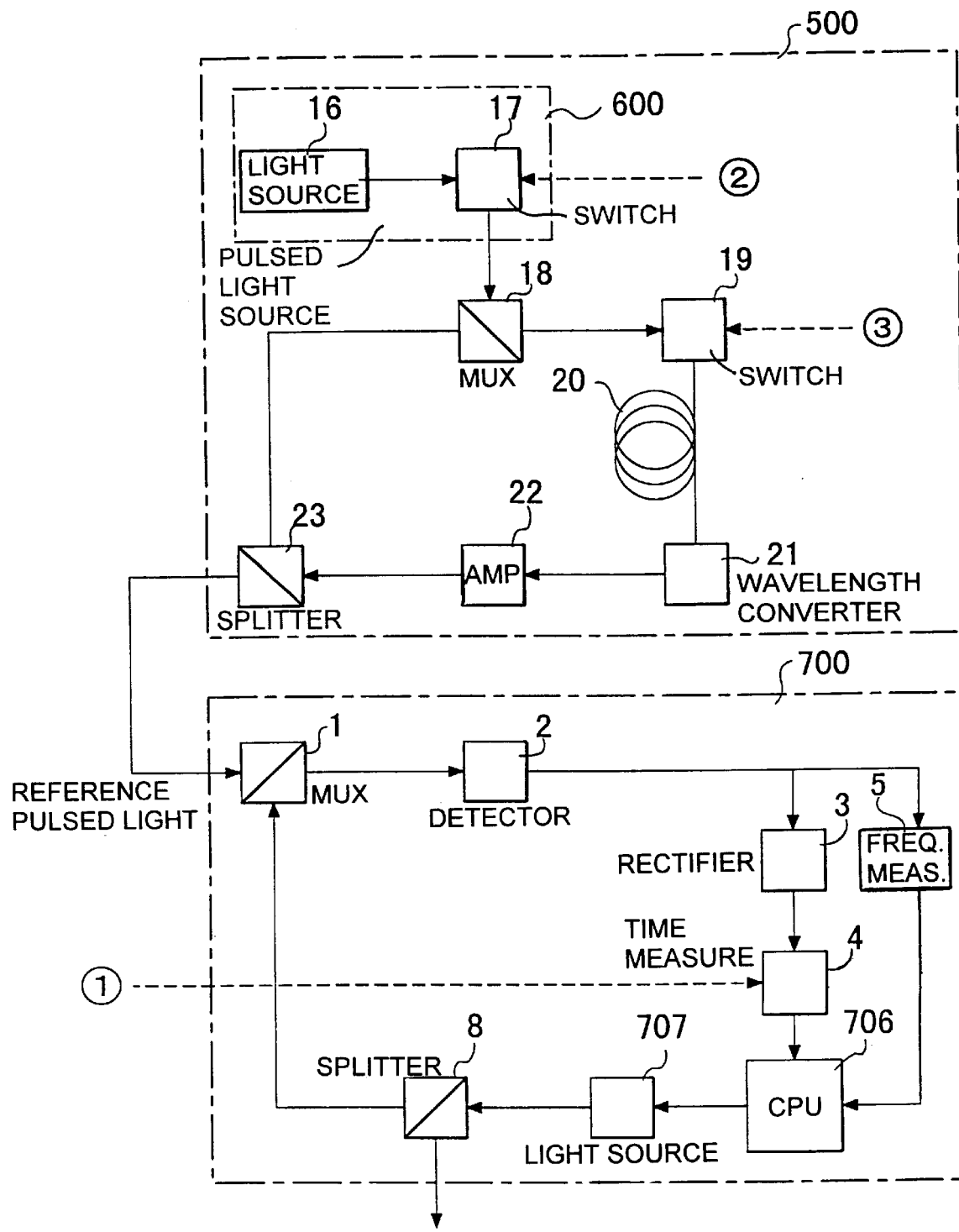
FIG. 7 is a block diagram showing an example of the structure of a conventional optical-frequency-stabilizing light source.

FIG. 1 is a block diagram showing an example of the structure of an optical-frequency-stabilized light source according to the first embodiment of the present invention. In FIG. 1, the parts corresponding to parts of the conventional optical-frequency-stabilized light source 700 (see FIG. 7) are denoted by the same reference numbers, and their descriptions are omitted.

The improvement in the optical-frequency-stabilized light source 100 comprises an optical splitter 9, a Fabry-Perot etalon control circuit 10, a Fabry-Perot etalon transmission detection circuit 11 and a control circuit 12. Additionally, the optical-frequency-stabilized light source 100 shown in FIG. 1 is provided with a CPU 6 instead of the CPU 706 and a local light source 7 instead of the local light source 707. The operations of the optical multiplexer 1, optical detector 2, rectifier 3, time measuring circuit 4, frequency measuring circuit 5 and optical splitter 8 are the same as those for the conventional optical-frequency-stabilized light source 700 described above.

Hereinbelow, the points which differ from the conventional optical-frequency-stabilized light source 700 shall be explained.

The output beam from the local light source 7 is output through the optical splitter 8 to the optical splitter 9 and the optical multiplexer 1. The optical splitter 9 extracts a part of the input beam as the output of the optical-frequency-stabilized light source 100 and outputs the remaining part of the input beam to the Fabry-Perot etalon transmission detection circuit 11. The Fabry-Perot etalon transmission detection circuit 11 outputs a signal corresponding to the transmission of the Fabry-Perot etalon based on the optical signal input from the optical splitter 9 and the control signal from the Fabry-Perot etalon control circuit 10. The details of the operations shall be described below. The control circuit 12 controls the optical frequency of the local light source 7 such as to equalize the output signal of the Fabry-Perot etalon transmission detection circuit 11 with a preset signal.

Figure 2:
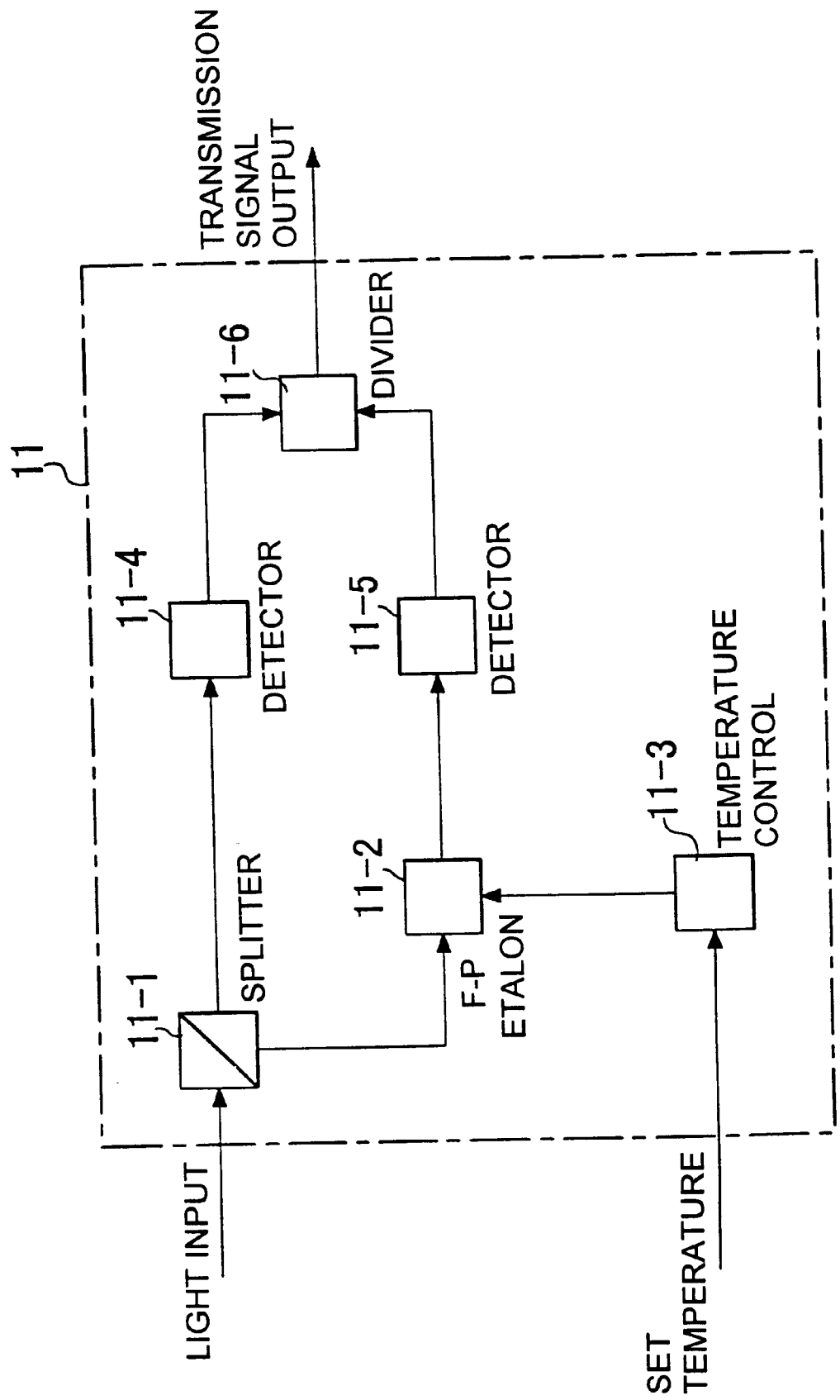
FIG. 2 is a block diagram showing an example of the structure of the Fabry-Perot etalon transmission detection circuit 11 according to the same embodiment.

Next, the structure and operations of the Fabry-Perot etalon transmission detection circuit 11, and the operations of the Fabry-Perot etalon control circuit 10 and the CPU 6 shall be explained. FIG. 2 is a block diagram showing an example of the structure of the Fabry-Perot etalon transmission detection circuit 11.

In this drawing, an optical splitter 11-1 splits optical signals input from the optical splitter 9 to a Fabry-Perot etalon 11-2 and an optical detector 11-4. The optical signal which passes through the Fabry-Perot etalon 11-2 is input to an optical detector 11-5.

The optical signals input to the optical detector 11-4 and optical detector 11-5 are respectively converted into electrical signals, and input to a divider 11-6. The divider 11-6 performs a division with the electrical signal from the optical detector 11-4 as the divisor and the electrical signal from the optical detector 1—5 as the dividend, and outputs a signal corresponding to the result. Consequently, the output signal of the divider 11-6 is a signal corresponding to the transmission rate of the Fabry-Perot etalon 11-2. A temperature control circuit 11-3 controls the temperature of the Fabry-Perot etalon in accordance with a signal from the Fabry-Perot etalon control circuit 10.

Figure 3:
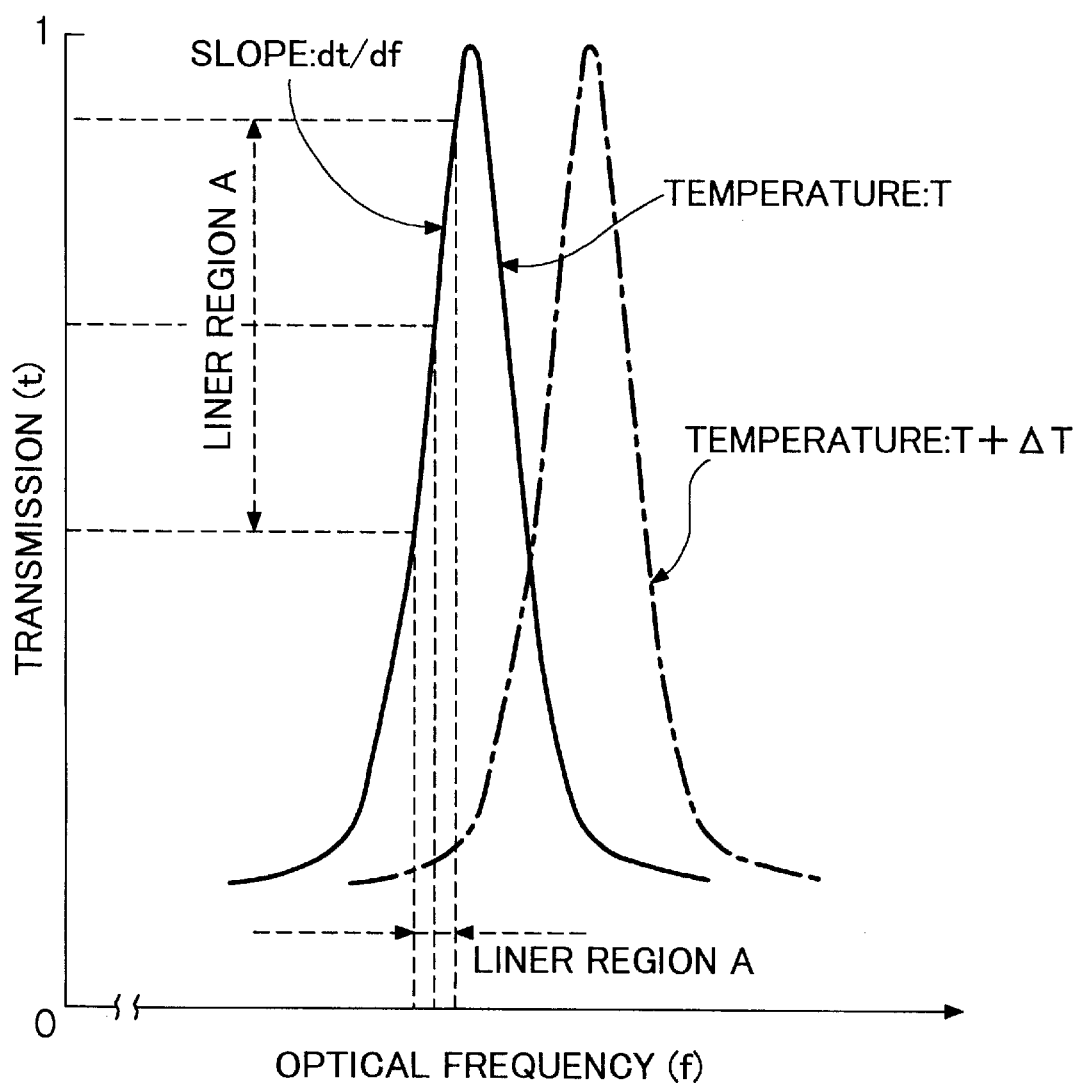
FIG. 3 is a graph showing an example of the optical frequency vs. transmission characteristics of light input to the Fabry-Perot etalon 11-2 according to the same embodiment.

FIG. 3 is a graph showing an example of the optical frequency vs. transmission characteristics of the light input to the Fabry-Perot etalon 11-2.

As shown in the drawing, when the temperature of the Fabry-Perot etalon 11-2 changes, the optical frequency vs. transmission characteristics shift roughly linearly along the optical frequency axis. By fixing the temperature and transmission of the Fabry-Perot etalon 11-2 to a constant value, the optical frequency of the light input to the Fabry-Perot etalon 11-2 can be fixed to a constant optical frequency. Additionally, by knowing the temperature dependence of the optical frequency vs. transmission characteristics, it is possible to set the optical frequency of the input light to an arbitrary value by controlling the temperature of the Fabry-Perot etalon 11-2 according to the temperature dependence of the optical frequency vs. transmission characteristics so that the transmission of the input light is always held at a specified value.

Additionally, in FIG. 1, the CPU 6 accurately detects the optical frequency of the local light source 7 based on a measurement data set (time, frequency) from the time measuring circuit 4 and the frequency measuring circuit S, and outputs a signal corresponding to the difference from the target optical frequency to the Fabry-Perot etalon control circuit 10.

The Fabry-Perot etalon control circuit 10 outputs a control signal to the temperature control circuit 11-3 such as to correct the temperature of the Fabry-Perot etalon 11-2.

As described above, the optical frequency of the output beam from the optical-frequency-stabilized light source 100 is first stabilized according to the optical frequency vs. transmission characteristics of the Fabry-Perot etalon 11-2. Since the transmission is continuously detectable at this time, there is little dispersion in the detected data, and it is possible to simplify or delete procedures for averaging the detected data. Furthermore, since the period of time from when the transmission is detected until the optical frequency of the local light source 7 is adjusted is determined within the zone of the Fabry-Perot etalon transmission detection circuit 11 and the control circuit 12, the repetition time of the reference pulsed light sequence can be made relatively high-speed. Additionally, since the optical frequency vs. transmission characteristics of the Fabry-Perot etalon 11-2 are corrected based on beat signals between the reference pulsed light and the local light source, an optical frequency accuracy equivalent to that of the conventional optical-frequency-stabilized light source 700 is ensured.

B. Second Embodiment

Next, a second embodiment of the present invention shall be explained.

Figure 4:
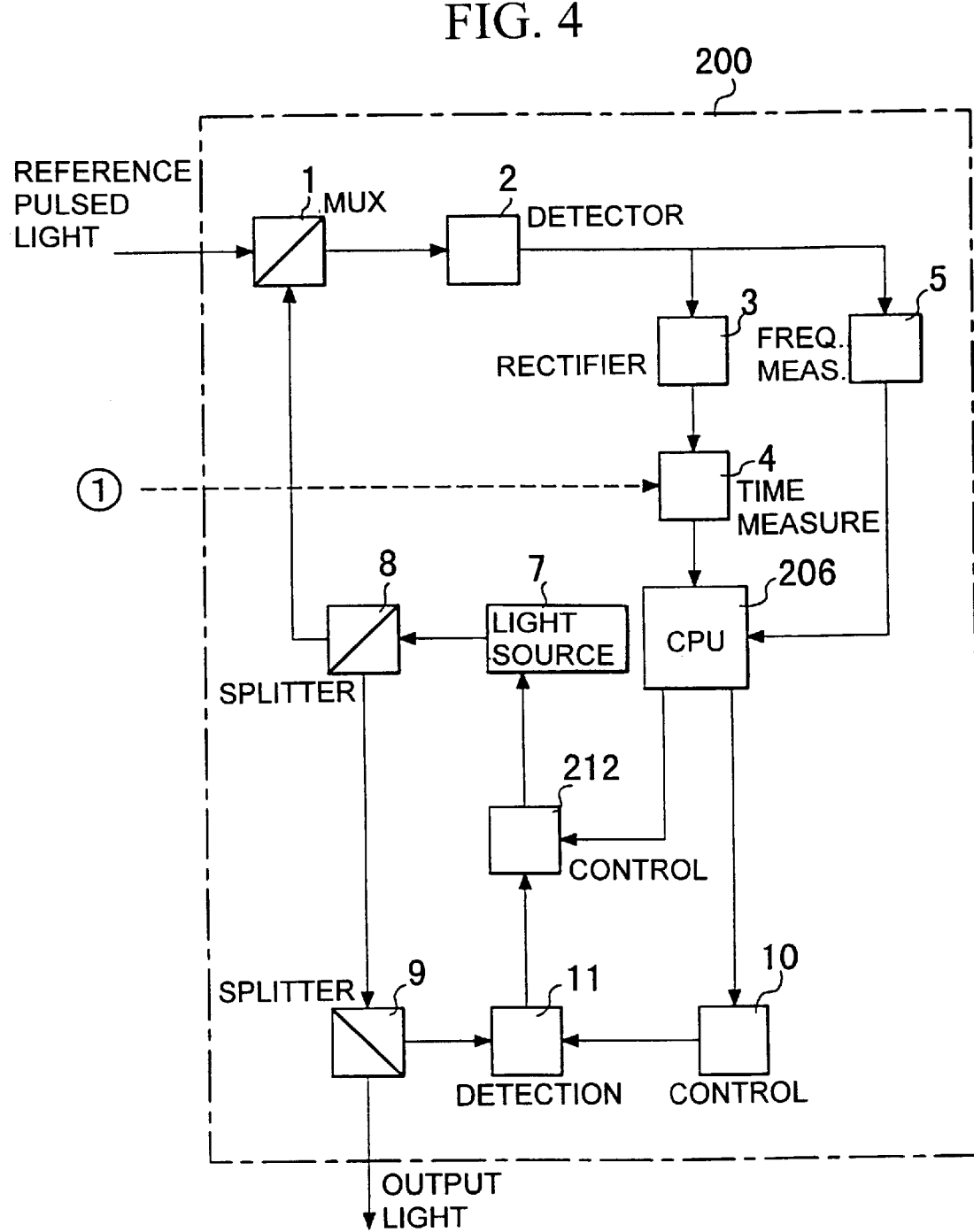
FIG. 4 is a block diagram showing an example of the structure of an optical-frequency-stabilized light source according to a second embodiment of the present invention.

FIG. 4 is a block diagram showing an example of the structure of an optical-frequency-stabilized light source according to a second embodiment of the present invention. In FIG. 4, the parts corresponding to parts of the optical-frequency-stabilized light source 100 (see FIG. 1) are denoted by the same reference numbers, and their descriptions are omitted.

The optical-frequency-stabilized light source 200 of FIG. 4 has a CPU 206 instead of the CPU 6, and a control circuit 212 instead of the control circuit 12, and the output of the CPU 206 is input to the control circuit 212.

When the optical frequency of the local light source 7 is in the linear region A of the optical frequency vs. transmission characteristics of the Fabry-Perot etalon 11-2, the Fabry-Perot etalon control circuit 10 does not output a control signal to the temperature control circuit 11-3 even if there is a deviation between that optical frequency and the target optical frequency. Therefore, in the optical-frequency-stabilized light source 200 shown in FIG. 4, the control circuit 212 outputs a control signal corresponding to the deviation from the target optical frequency to the local light source 7, based on the output signal of the CPU 206 and the slope of the optical frequency vs. transmission characteristics. Thus, according to the present embodiment, when the optical frequency of the local light source 7 is inside the linear region A of the optical frequency vs. transmission characteristics of the Fabry-Perot etalon 11-2, the optical frequency of the local light source 7 is controlled by changing the target transmission based on the output signal of the CPU 206 and the optical frequency vs. transmission characteristics. Consequently, there is no need to change the temperature of the Fabry-Perot etalon 11-2, so that the temperature response time is cut, thus enabling the control time to be shortened and improving the stability.

On the other hand, when the optical frequency of the local light source 7 is outside the linear region A, the Fabry-Perot etalon control circuit 10 and the control circuit 212 operate in the same manner as the Fabry-Perot etalon control circuit 10 and the control circuit 12 of the first embodiment.

C. Third Embodiment

Next, a third embodiment of the present invention shall be explained.

Figure 5:
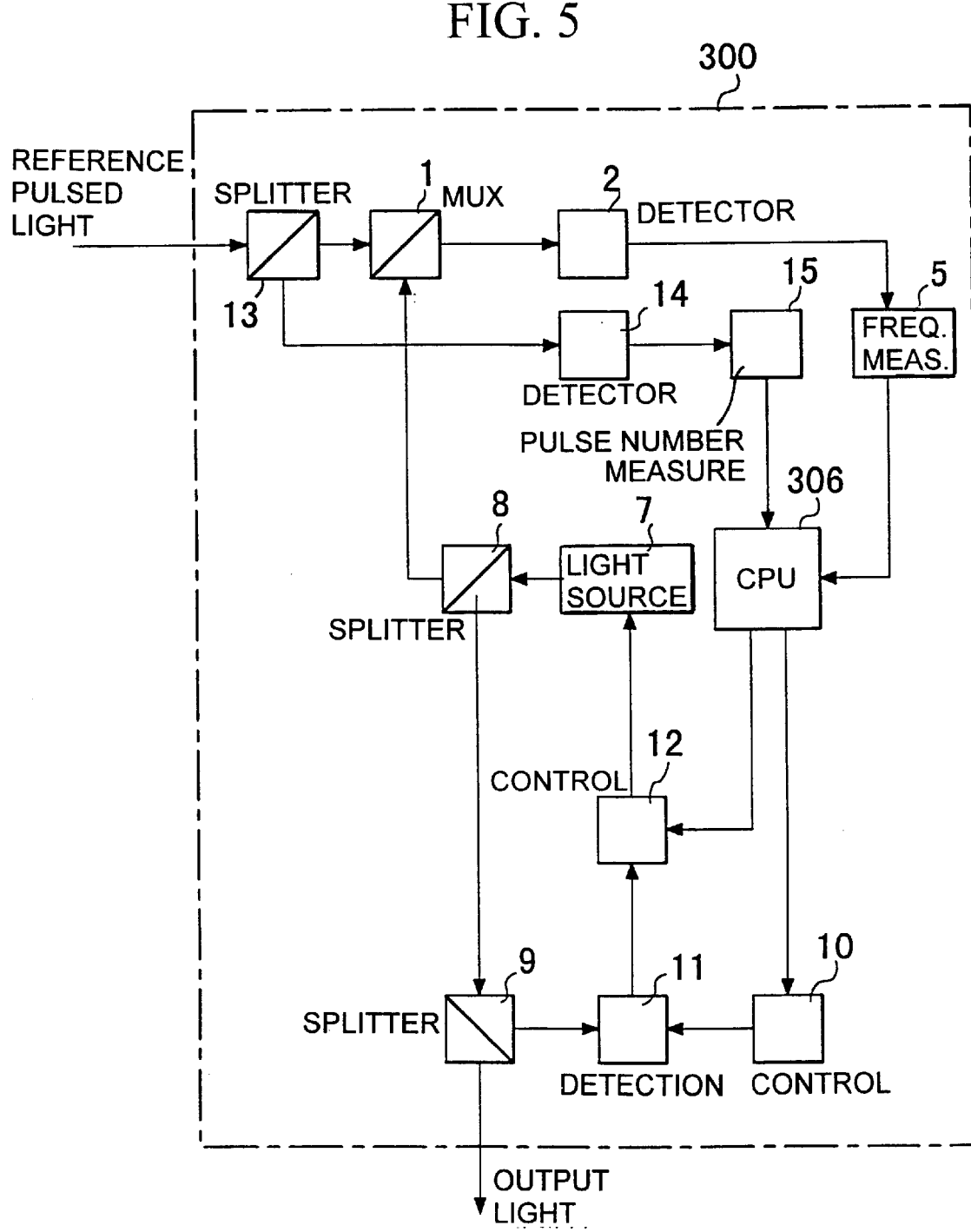
FIG. 5 is a block diagram showing an example of the structure of an optical-frequency-stabilized light source according to a third embodiment of the present invention.

FIG. 5 is a block diagram showing an example of the structure of an optical-frequency-stabilized light source according to a third embodiment of the present invention. In FIG. 5, the parts corresponding to parts of the optical-frequency-stabilized light source 100 (see FIG. 1) are denoted by the same reference numbers, and their descriptions are omitted.

In the optical-frequency-stabilized light source 300 of FIG. 5, the rectifier 3 and time measuring circuit 4 are eliminated, and an optical splitter 13, an optical detector 14 and a pulse number measuring circuit 15 are added. Additionally, the optical-frequency-stabilized light source 300 shown in FIG. 5 is provided with a CPU 306 instead of the CPU 6.

With reference to the drawing, the optical splitter 13 split a reference pulsed light sequence which is input, and outputs the split light to the optical multiplexer 1 and the optical detector 14. The optical detector 14 converts the input optical signal into an electrical signal, which is input to the pulse number measuring circuit 15. The pulse number measuring circuit 15 detects the repetition period of the reference pulsed light sequence from the input signal, continuously measures the pulse number in synchronization with the period thereof, and outputs the pulse number to the CPU 306. The CPU 306 reads the frequency of the reference pulsed light from the frequency measuring circuit S and the pulse number at which that frequency was obtained from the pulse number measuring circuit 15 as a set of data, and calculates the optical frequency of the local light source 7. The subsequent operations are identical to those of the first embodiment and will therefore will be omitted from explanation.

D. Fourth Embodiment

Figure 6:
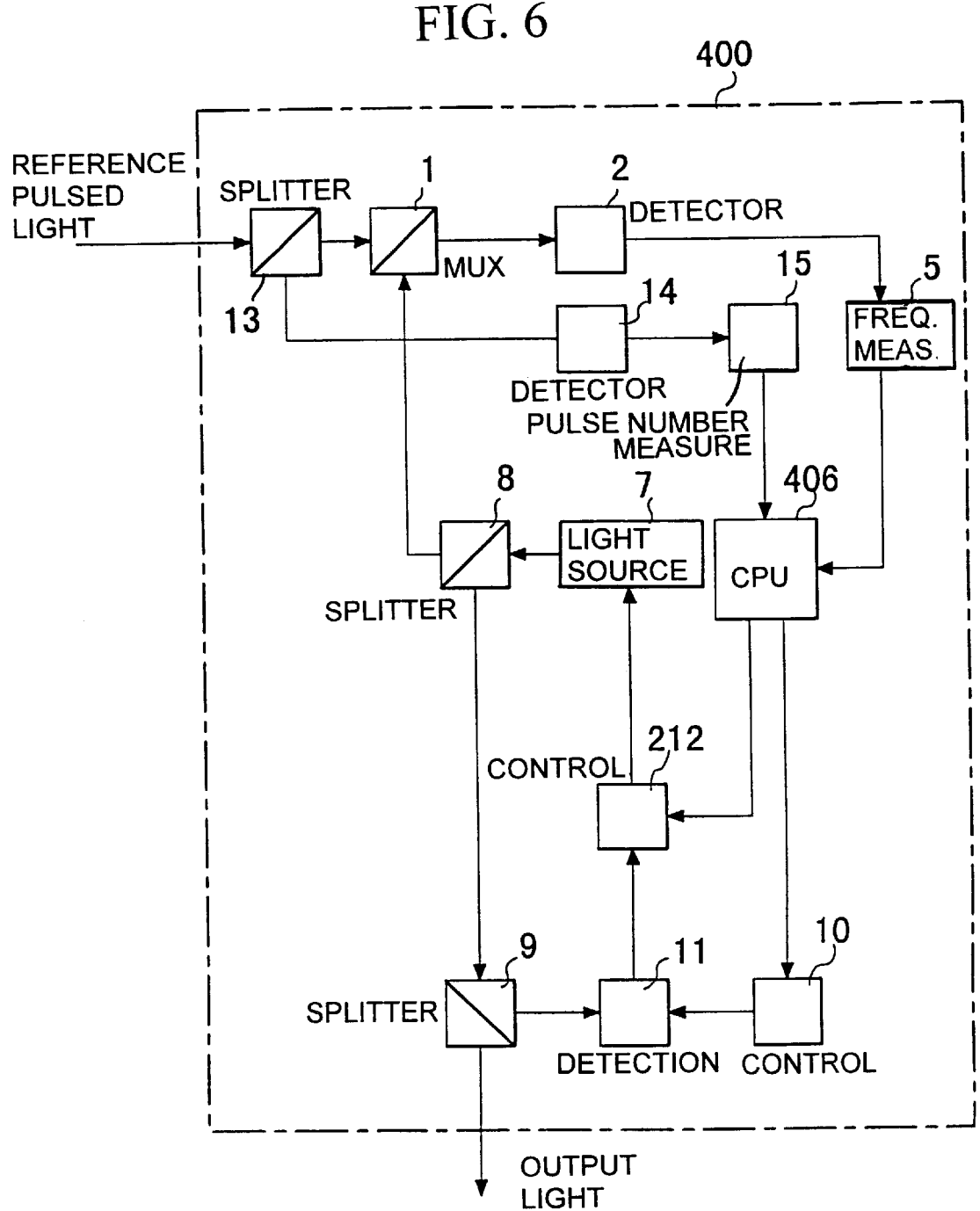
FIG. 6 is a block diagram showing an example of the structure of an optical-frequency-stabilized light source according to a fourth embodiment of the present invention.

Next, a fourth embodiment of the present invention shall be explained. FIG. 6 is a block diagram showing an example of the structure of an optical-frequency-stabilized light source according to a fourth embodiment of the present invention. In FIG. 6, the parts corresponding to parts of the optical-frequency-stabilized light source 100 (see FIG. 1) are denoted by the same reference numbers, and their descriptions are omitted.

The optical-frequency-stabilized light source 400 shown in FIG. 6 combines the optical-frequency-stabilized light source 200 of the second embodiment with the optical-frequency-stabilized light source 300 of the third embodiment. That is, the optical-frequency-stabilized light source 400 shown in FIG. 6 has a CPU 406 instead of the CPU 6 and a control circuit 212 instead of the control circuit 12, and the output of the CPU 406 is introduced to the control circuit 212. Additionally, in the optical-frequency-stabilized light source 400 shown in FIG. 6, the rectifier 3 and the time measuring circuit 4 are eliminated, while the optical splitter 13, the optical detector 14 and the pulse number measuring circuit 15 are added.

With reference to the drawing, the optical splitter 13 splits the input reference pulsed light sequence and outputs the split light to the optical multiplexer 1 and the optical detector 14. The optical detector 14 converts the input optical signal into an electrical signal, which is then input to the pulse number measuring circuit 15. The pulse number measuring circuit 15 detects the repetition period of the reference pulsed light sequence from the input signal, continuously measures the pulse number in synchronization with the period thereof, and outputs the pulse number to the CPU 406. The CPU 406 reads the frequency of the reference pulsed light from the frequency measuring circuit 5 and the pulse number at which that frequency was obtained from the pulse number measuring circuit 15 as a set of data, and calculates the optical frequency of the local light source 7.

Furthermore, when the optical frequency of the local light source 7 is in the linear region of the optical frequency vs. transmission characteristics of the Fabry-Perot etalon 11-2, the Fabry-Perot etalon control circuit 10 does not output a control signal to the temperature control circuit 11-3 even if there is a deviation between that optical frequency and the target optical frequency. Therefore, in the optical-frequency-stabilized light source 400 shown in FIG. 6, the control circuit 212 outputs a control signal corresponding to the deviation from the target optical frequency to the local light source 7, based on the output signal of the CPU 406 and the slope of the optical frequency vs. transmission characteristics. Thus, according to the present embodiment, when the optical frequency of the local light source 7 is inside the linear region A of the optical frequency vs. transmission characteristics of the Fabry-Perot etalon 11-2, the optical frequency of the local light source 7 is controlled by changing the target transmission based on the output signal of the CPU 406 and the optical frequency vs. transmission characteristics. Consequently, there is no need to change the temperature of the Fabry-Perot etalon 11-2, so that the temperature response time is cut, thus enabling the control time to be shortened and improving the stability.

On the other hand, when the optical frequency of the local light source 7 is outside the linear region A, the Fabry-Perot etalon control circuit 10 and the control circuit 212 operate in the same manner as the Fabry-Perot etalon control circuit 10 and the control circuit 12 of the first embodiment.

While possible embodiments of the present invention have been described in detail with reference to the drawings above, the specific structure is not to be construed as being limited by these embodiments, and any modifications in the design which are within a range such as not to contradict the gist of the present invention are included within the scope of the present invention.

What is claimed is:

1. An optical-frequency-stabilized light source comprising:

a local light source for generating light of an arbitrary optical frequency;

a first optical splitter for splitting output light from said local light source into two parts;

an optical multiplexer for combining one of the outputs of said first optical splitter with reference pulsed light;

a first optical detector for detecting, based on the output light from said optical multiplexer, a pulsed beat signal which is a superimposition of a difference in frequencies between the frequency of the light from said local light source and the frequency of the reference pulsed light;

a rectifier for rectifying a beat signal detected by said first optical detector, and for generating a rectangular pulse;

a time measuring circuit for measuring the time at which the rectangular pulse from said rectifier is obtained in synchronization with a repetition period of said reference pulsed light;

a frequency measuring circuit for measuring a beat frequency based on said beat signal detected by said first optical detector;

calculation means for calculating the frequency of the light from said local light source based on output signals from said time measuring circuit and said frequency measuring circuit, and outputting a control signal corresponding to a deviation from a predetermined target optical frequency;

a second optical splitter for splitting the second output of said first optical splitter into two parts and outputting one part from an output terminal;

optical frequency discriminating means for outputting, based on the second output of said second optical splitter, an electrical signal corresponding to the optical frequency thereof;

a control circuit for controlling the frequency of said local light source such that the signal from said optical frequency discriminating means remains an electrical signal corresponding to the target optical frequency; and optical frequency discrimination control means for outputting a correction signal to said optical frequency discriminating means for correcting the relationship between the optical frequency of the light input to said optical frequency discriminating means and the electrical signal output by said optical frequency discriminating means, based on a control signal output by said calculation means.

2. An optical-frequency-stabilized light source in accordance with claim 1, wherein said optical frequency discriminating means comprises:

a third optical splitter for splitting the second output of said second optical splitter into two parts;

a second optical detector for detecting one of the outputs of said third optical splitter;

transmission means to which the second output of said third optical splitter is provided, for transmitting the input light at a transmission rate that depends on the optical frequency of the input light and the temperature of said transmission means;

a third optical detector for detecting optical signals transmitted by said transmission means;

a divider for outputting an electrical signal corresponding to the transmission rate of said transmission means by dividing the electrical signals obtained from said third optical detector with the electrical signals obtained from said second optical detector; and a temperature control circuit for controlling the temperature of said transmission means based on the correction signals from said optical frequency discrimination control means.

3. An optical-frequency-stabilized light source in accordance with claim 2, wherein said control circuit corrects the electrical signal corresponding to said target optical frequency based on control signals from said calculation means.

4. An optical-frequency-stabilized light source in accordance with claim 2, wherein said transmission means includes a Fabry-perot etalon.

5. An optical-frequency-stabilized light source in accordance with claim 1, wherein said control circuit corrects the electrical signal corresponding to said target optical frequency based on control signals from said calculation means.

6. An optical-frequency-stabilized light source comprising:

a local light source for generating light of an arbitrary optical frequency;

a first optical splitter for splitting output light from said local light source into two parts;

a second optical splitter for splitting reference pulsed light;

an optical multiplexer for combining one of the outputs of said first optical splitter with one of the outputs of said second optical splitter;

a first optical detector for detecting, based on the output light from said optical multiplexer, a pulsed beat signal which is a superimposition of a difference in frequencies between the frequency of the light from said local light source and the frequency of the reference pulsed light;

a frequency measuring circuit for measuring a beat frequency based on said beat signal detected by said first optical detector;

a second optical detector for detecting the optical signal of the second output of said second optical splitter;

a pulse number measuring circuit for measuring a pulse number of the signal from said second optical detector;

calculation means for calculating the optical frequency of the light from said local light source based on output signals from said pulse number measuring circuit and said frequency measuring circuit, and outputting a control signal corresponding to a deviation from a predetermined target optical frequency;

a third optical splitter for splitting the second output of said first optical splitter into two parts and outputting one part from an output terminal;

optical frequency discriminating means for outputting, based on the second output of said third optical splitter, an electrical signal corresponding to the optical frequency thereof;

a control circuit for controlling the frequency of said local light source such that the signal from said optical frequency discriminating means remains an electrical signal corresponding to the target optical frequency; and optical frequency discrimination control means for outputting a correction signal to said optical frequency discriminating means for correcting the relationship between the optical frequency of the light input to said optical frequency discriminating circuit and the electrical signal output by said optical frequency discriminating means, based on a control signal output by said calculation means.

7. An optical-frequency-stabilized light source in accordance with claim 6, wherein said optical frequency discriminating means comprises:

a fourth optical splitter for splitting the second output of said third optical splitter into two parts;

a third optical detector for detecting an optical signal of one of the outputs of said fourth optical splitter;

transmission means to which the second output of said fourth optical splitter is input, for transmitting the input light at a transmission rate that depends on the frequency of the input light and the temperature of said transmission means;

a fourth optical detector for detecting optical signals transmitted by said transmission means;

a divider for outputting an electrical signal corresponding to the transmission rate of said transmission means by dividing the electrical signals obtained from said fourth optical detector with the electrical signals obtained from said third optical detector ; and a temperature control circuit for controlling the temperature of said transmission means based on the correction signals from said optical frequency discrimination control means.

8. An optical-frequency-stabilized light source in accordance with claim 7, wherein said control circuit corrects the electrical signal corresponding to said target optical frequency based on control signals from said calculation means.

9. An optical-frequency-stabilized light source in accordance with claim 7, wherein said transmission means includes a Fabry-Perot etalon.

10. An optical-frequency-stabilized light source in accordance with claim 6, wherein said control circuit corrects the electrical signal corresponding to said target optical frequency based on control signals from said calculation means.

* * * * *